(12) United States Patent
Bender et al.

(10) Patent No.: US 8,951,656 B2
(45) Date of Patent: Feb. 10, 2015

(54) ELECTRICAL ENERGY STORE OF A MOTOR VEHICLE

(75) Inventors: Stefan Bender, Ludwigsburg (DE); Steffen Maurer, Stuttgart (DE); Richard Krestel, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 345 days.

(21) Appl. No.: 13/369,576

(22) Filed: Feb. 9, 2012

(65) Prior Publication Data

US 2012/0208053 A1 Aug. 16, 2012

(30) Foreign Application Priority Data

Feb. 14, 2011 (DE) .......................... 10 2011 000 695

(51) Int. Cl.
*H01M 10/50* (2006.01)
*H01M 2/10* (2006.01)
*H01M 6/46* (2006.01)
*H01M 2/00* (2006.01)

(52) U.S. Cl.
USPC ............. 429/120; 429/99; 429/100; 429/153; 429/163

(58) Field of Classification Search
CPC ............ H01M 2/1083; H01M 6/5038; H01M 10/5059; H01M 10/5055; H01M 10/5057; H01M 2220/20

USPC .............. 429/96, 98–100, 120, 153, 163, 176
See application file for complete search history.

(56) References Cited

U.S. PATENT DOCUMENTS

| | | | | |
|---|---|---|---|---|
| 2,710,660 | A | * | 6/1955 | Coleman ...................... 180/68.5 |
| 2,980,195 | A | * | 4/1961 | Herbst .......................... 180/68.5 |
| 6,300,003 | B1 | * | 10/2001 | Misra et al. ................... 429/100 |
| 8,383,260 | B2 | * | 2/2013 | Essinger et al. .............. 429/120 |
| 2011/0132580 | A1 | | 6/2011 | Herrmann et al. |

FOREIGN PATENT DOCUMENTS

| | | |
|---|---|---|
| DE | 10 2007 010 742 | 8/2008 |
| DE | 10 2008 027 293 | 12/2009 |
| DE | 10 2008 059 680 | 6/2010 |
| DE | 2009035487 | * 2/2011 |
| DE | 102009035487 | 2/2011 |
| JP | 2007257901 | 10/2007 |
| WO | 2010/135456 | 11/2010 |

* cited by examiner

*Primary Examiner* — Ula C. Ruddock
*Assistant Examiner* — Thomas H. Parsons
(74) *Attorney, Agent, or Firm* — Gerald E. Hespos; Michael J. Porco; Matthew T. Hespos

(57) ABSTRACT

An electrical energy store of a motor vehicle, in particular a high voltage energy store of a hybrid vehicle or of an electric vehicle, having a housing (11) and having storage modules (12) accommodated in the housing (11). The housing (11) having a supporting element (17) connecting the electrical energy store to a vehicle bodywork structure of a motor vehicle. The temperature of the storage modules (12) can be controlled via the supporting element (17).

8 Claims, 4 Drawing Sheets

ELECTRICAL ENERGY STORE OF A MOTOR VEHICLE

CROSS REFERENCE TO RELATED APPLICATION

This application claims priority under 35 USC 119 to German Patent Appl. No. 10 2011 000 695.8 filed on Feb. 14, 2011, the entire disclosure of which is incorporated herein by reference.

BACKGROUND OF THE INVENTION

1. Field of the Invention

The invention relates to an electrical energy store of a motor vehicle, in particular a high voltage energy store of a hybrid vehicle or of an electric vehicle.

2. Description of the Related Art

High voltage energy stores used in a hybrid vehicle or in an electric vehicle are discharged to a relatively high degree in the motor mode of an electric machine of the vehicle and charged to a relatively high degree in the generator mode of the respective electric machine. Electric energy stores have a housing and storage modules are accommodated in the housing.

Separate devices are used in the prior art to position and mount an electrical energy store. For example, DE 10 2008 059 680 A1 discloses a battery mounting device with a trough-like receptacle for holding a battery, a bracket that encloses the trough-like receptacle and a securing element. The securing element is attached to the bracket and functions to secure the battery in the trough-like receptacle. Accordingly, a separate device is required to attach or mount an electrical energy store in the motor vehicle.

Similarly, separate devices are used in the prior art to control the temperature of the electrical energy store. For example, DE 10 2008 027 293 A1 discloses a cooling device for a vehicle battery in which electrical elements that are to be cooled are attached via mounting elements to a separate cooling body Accordingly, a separate device is required to cool or control the temperature of an electrical energy store.

Accordingly, the object of providing a novel electrical energy store of a motor vehicle.

SUMMARY OF THE INVENTION

The invention relates to a housing with a supporting element for connecting the electrical energy store to a vehicle bodywork structure of a motor vehicle and for controlling the temperature of the storage modules of the electrical energy store.

Thus, the supporting element of the housing of the electrical energy store connects the electrical energy store to a vehicle bodywork structure of a motor vehicle and also control the temperature of the storage modules of the electrical energy store, specifically to cool and/or heat said storage modules.

According to the invention, the attachment function for attaching the electrical energy store to the vehicle bodywork structure and the cooling function for cooling the storage cells of the electrical energy store are performed by one assembly, specifically the supporting element, which is a component of the housing of the electrical energy store. As a result a lightweight and compact design of an electrical energy store is provided.

The supporting element preferably has an annular supporting frame, and the electrical energy store can be connected to the vehicle bodywork structure via the annular supporting frame. The supporting element also has at least one supporting plate and a cavity through which a temperature controlling medium flows. Thus, the temperature of at least one storage module can be can be cooled and/or heated via the supporting plate.

Thus, the supporting element comprises an annular supporting frame as well as at least one supporting plate attached to the annular supporting frame. The electrical energy store can be connected to the vehicle bodywork structure of a motor vehicle via the annular supporting frame. The temperature of the storage modules can be controlled via the supporting plate, which is connected to the supporting frame. The storage modules can either be attached to the supporting plate and the supporting plate can be attached to the supporting frame. This permits a particularly simple design of an electrical energy store.

Exemplary embodiments of the invention are explained in more detail with reference to the drawing without being restricted thereto.

DETAILED DESCRIPTION OF THE PREFERRED EMBODIMENTS

Figure 1:
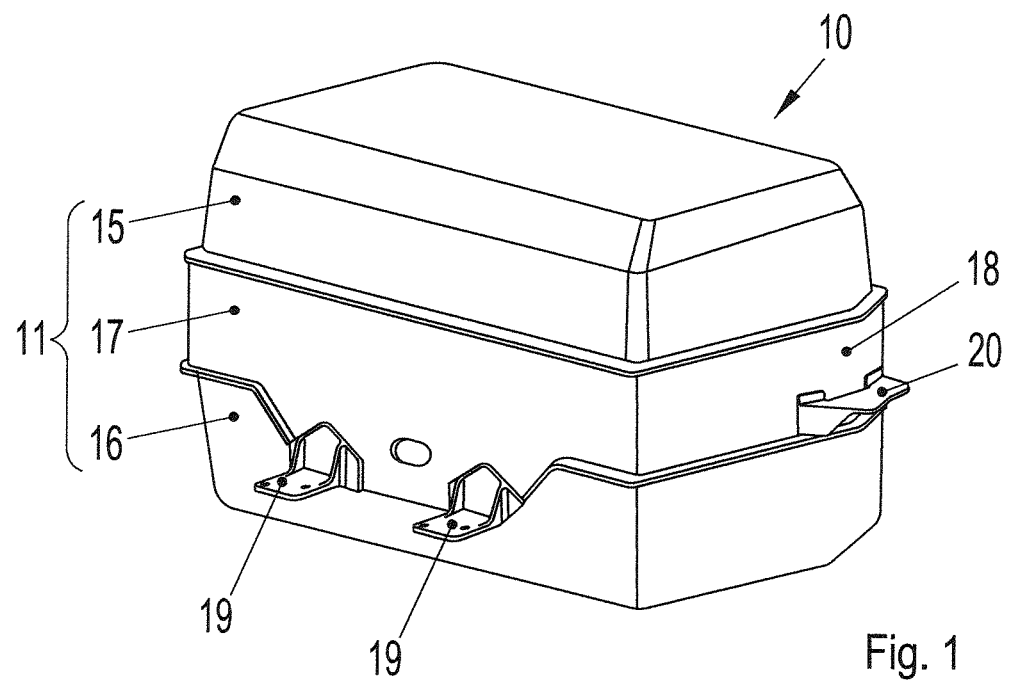
FIG. 1 is a perspective view of an exemplary embodiment of an electrical energy store according to the invention.
Figure 2:
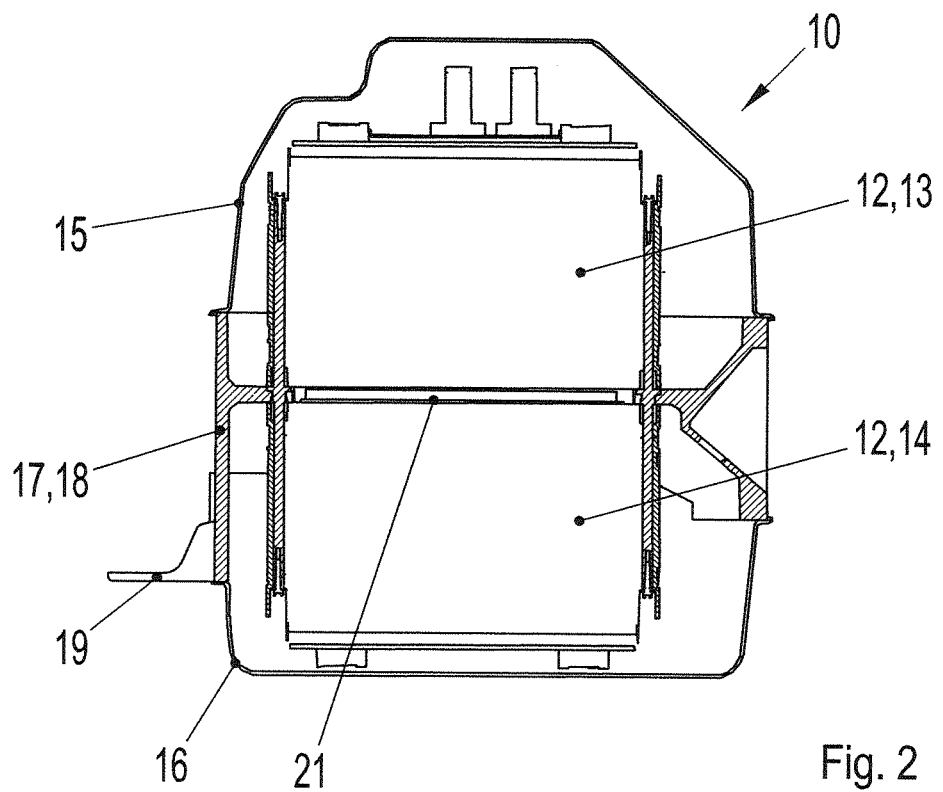
FIG. 2 is a cross section through the electrical energy store.

The invention relates to an electrical energy store of a motor vehicle, in particular a high voltage energy store of a hybrid vehicle or of an electric vehicle. A drive assembly of a hybrid vehicle or of an electric vehicle comprises an electric machine that can be operated as a motor and as a generator. The electrical energy store is a high voltage energy store that is discharged to a relatively high degree by the electric machine in the motor mode. Similarly, the high voltage energy store is charged to a relatively high degree by the electric machine in the generator mode.

The electrical energy store 10 has a housing 11 and storage modules 12 are accommodated in the housing 11. In the illustrated embodiment, the storage modules 12 form a first or upper module packet 13 with a plurality of storage modules 12, and a second or lower module packet 14 with a plurality of storage modules 12.

The housing 11 of the electrical energy store 10 comprises a housing upper part 15, a housing lower part 16 and a supporting element 17. The supporting element 17 functions to attach or mount the electrical energy store 10 to a vehicle bodywork structure of a motor vehicle and also to control the temperature of the storage modules 12 of the electrical energy store 10, specifically to cool and/or heat the storage modules 12.

The housing 11 of the electrical energy store 10 accordingly functions not only to delimit the storage modules 12 from the surroundings on the outside, but rather the supporting element 17 of the housing 11 also functions to attach the energy store 10 to a vehicle bodywork structure 100 and to cool the storage modules 12 of the electrical energy store 10.

The supporting element 17 of the housing 11 has an annular supporting frame 18 and web-like attachment sections 19 and 20 are integral to the annular supporting frame 18. The attachment sections 19 and 20 of the annular supporting frame 18 of the supporting element 17 enable the electrical energy store 10 to be connected to the bodywork structure 100 of the motor vehicle. More particularly, the attachment sections 19 and 20 have cutouts (not shown) through which screws (not shown) extend to attach the electrical energy store 10 to a vehicle bodywork structure.

The housing upper part 15 and the housing lower part 16 each are connected detachably to the annular supporting frame 18 of the supporting element 17. Thus, the annular supporting frame 18 of the supporting element 17 extends between the housing upper part 15 and the housing lower part 16 to define a component of the housing 11.

The supporting element 17 also has at least one supporting plate 21 that extends between opposed parts of the annular supporting frame 18 and has a cavity 22 through which a temperature controlling medium flows. The supporting plate 21, or each supporting plate 21, of the supporting element 17 controls the temperature of the storage modules 12 by cooling and/or heating the storage modules 12.

Figure 6:
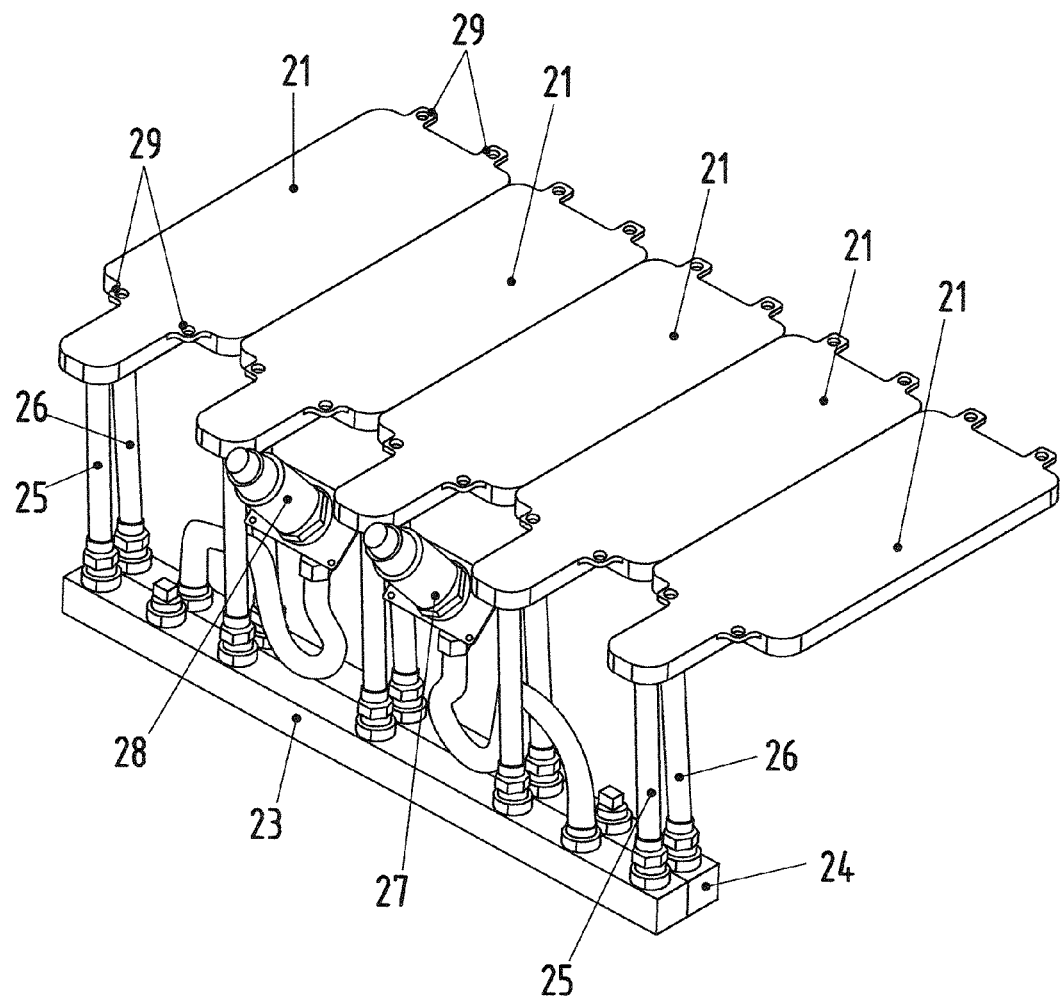
FIG. 6 is a perspective view of supporting plates of the electrical energy store that function to control the temperature of storage modules.

As shown in FIG. 6, the supporting element 17 of the electrical energy store 10 comprises a plurality of supporting plates 21 and a temperature controlling medium flows through each of the supporting plates 21. For this purpose each supporting plate 21 has a corresponding cavity and all of the supporting plates 21 are connected to a common forward feed line 23 and a common return line 24 for the temperature controlling medium via corresponding connecting lines 25, 26. Connecting elements 27 and 28, which are accessible from the outside of the housing, enable the forward feed line 24 and the return line 23 to be connected to an external circuit for the temperature controlling medium.

Each of the supporting plates 21, which serve to control the temperature of storage modules 12 of the electrical energy store, is made of metal and preferably aluminum or an aluminum alloy, wherein each metallic supporting plate 21 of the supporting element 17 is connected individually, preferably screwed, to the annular supporting frame 18 of the supporting element 17, which also is formed from metal. For example, FIG. 6 shows cutouts 29 in each supporting plate 21. Screws (not shown) can be extended through the cutouts 29 for attaching the supporting plates 21 to the supporting frame 18 of the supporting element 17.

The annular supporting frame also can be formed from a fiber-reinforced plastic. In this case, the metallic supporting plates preferably are bonded to the fiber-reinforced plastic supporting frame.

As noted above, the storage modules 12 of the electrical energy store 10 preferably form the two module packets 13 and 14. Each of the supporting plates 21, also function as temperature controlling plates. Thus, the supporting element 17 functions to control the temperature of storage modules 12 of the upper module packet 13 and to control the temperature of storage modules 12 of the lower module packet 14. The respective supporting plates 21 are positioned between the storage modules 12 of the respective module packets 13 and 14 to control the temperature.

Figure 3:
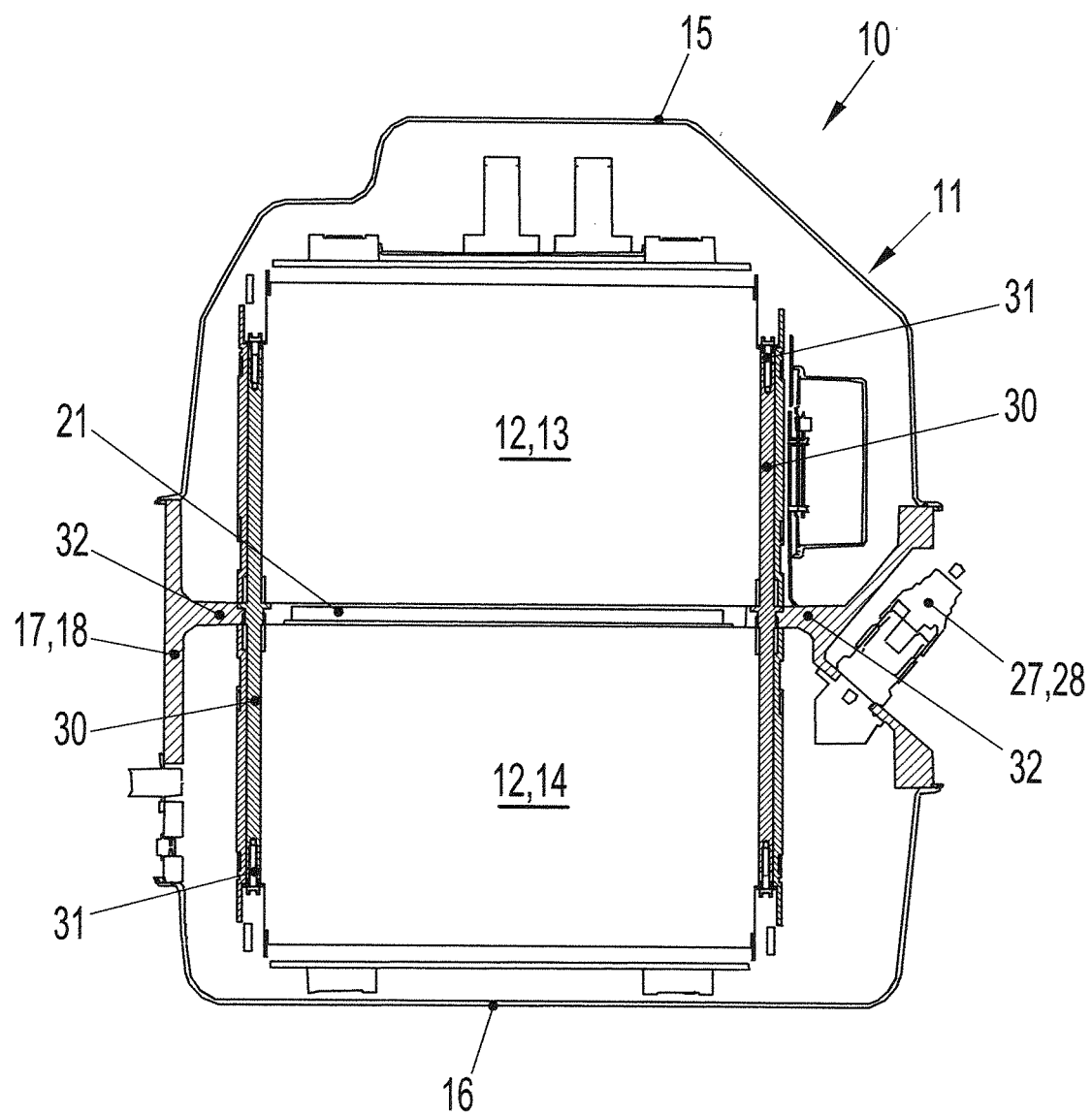
FIG. 3 is a further cross section through the electrical energy store.
Figure 4:
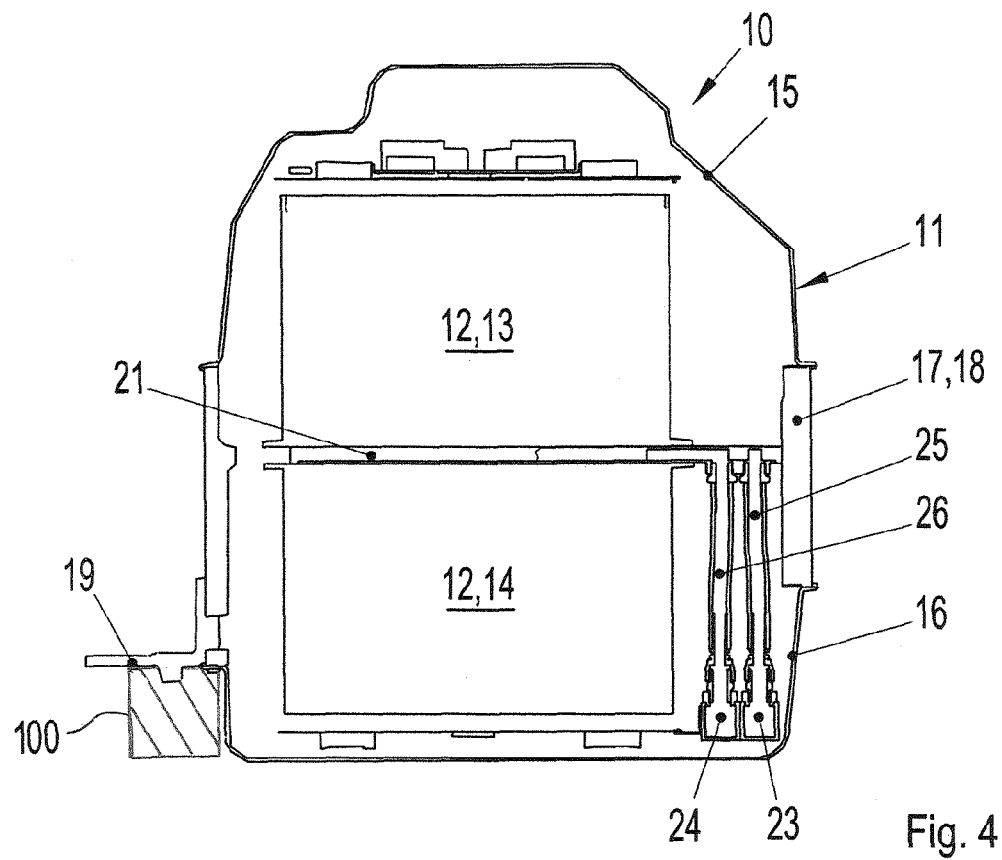
FIG. 4 is another cross section through the electrical energy store.
Figure 5:
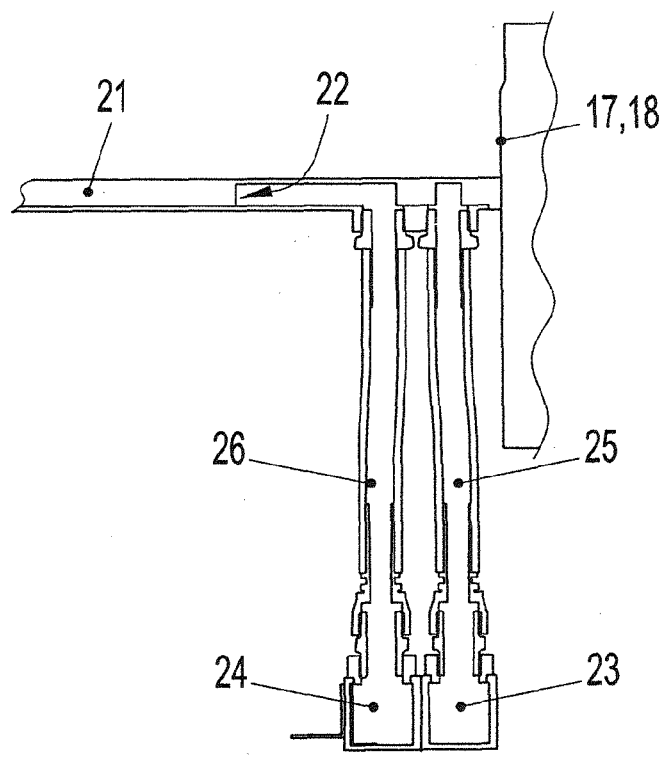
FIG. 5 is a detail of FIG. 4.

The storage modules 12 and the supporting plates 21 are attached to the supporting frame 18. More particularly, bolts 30 and screws 31 attach the storage modules 12 of the module packets 13 and 14 to the supporting frame 18, as shown in FIG. 3. The bolts 30 penetrate cutouts in the storage modules 12 and connect to an inwardly directed section 32 of the supporting frame 18. The screws 31 then attach the storage modules 12 to the bolts 30 and via the bolts 30 to the section 32 of the supporting frame 18.

Each supporting plate 21, which also is a temperature controlling plate, is attached individually to the supporting frame 18, and each storage module 12 also is mounted individually on the supporting frame 18. Thus, in each case a supporting plate 21 is positioned between two storage modules 12 that are positioned one on top of the other so that supporting plate 21 performs the temperature control of the storage modules 12 that are positioned one on top of the other. The storage modules 12 of the upper module packet 13 stand on the supporting frame 18, while the storage modules 12 of the lower module packet 14 are suspended from the supporting frame 18.

The supporting frame 18 encloses sections of the two module packets 13 and 14 lying opposite one another. Sections of the module packets 13 and 14 that are not enclosed by the supporting frame 18 are covered by the housing upper part 15 or the housing lower part 16 in the mounted state of the electrical energy store 10.

The housing 11 of the invention: covers the storage modules 12 from the outside; attaches the electrical energy store 10 to a vehicle bodywork structure of a motor vehicle; and controls the temperature of the storage modules 12. The supporting element 17 of the housing 11 attaches the electrical energy store 10 to the vehicle bodywork structure and controls the temperature of the storage modules 12.

The supporting frame 18 attaches the electrical energy store 10 to a vehicle bodywork structure, the supporting frame 18 cooperates with the supporting plates 21 to take up forces and torque and the supporting plates 21 control the temperature of the storage cells 12.

All forces and the torque are taken up by the supporting element 17. Thus, the housing upper part 15 and the housing lower part 16 can be non-load-bearing components. As a result, the weight of the electrical energy store 10 can be reduced.

What is claimed is:

1. An electrical energy store of a motor vehicle, comprising: a housing having a supporting element with an annular supporting frame that has attachment sections for connecting the electrical energy store to a vehicle bodywork structure of the motor vehicle, at least one supporting plate extending between spaced apart positions on the annular supporting frame, first and second storage module packets attached respectively to opposite first and second sides of the supporting element, first and second lids detachably connected to the annular supporting frame and covering the respective first and second storage module packets, and at least one cavity formed in the supporting plate for accommodating a flow of a temperature controlling medium for controlling the temperature of the storage modules.

2. The electrical energy store of claim 1, wherein the at least one supporting plate of the supporting element comprises plural supporting plates, and the at least one cavity comprises plural cavities disposed respectively in the supporting plates and through which the temperature controlling medium flows, all of the supporting plates being connected to a common forward feed line for the temperature controlling medium and to a common return line for the temperature controlling medium via corresponding connecting lines.

3. The electrical energy store of claim 1, wherein the annular supporting frame and the supporting plate are fabricated from metal, and wherein the annular supporting frame is screwed to each of the supporting plates.

4. The electrical energy store of claim 3, wherein the metal is aluminum or an aluminum alloy.

5. The electrical energy store of claim 1, wherein the annular supporting frame is made of plastic or a fiber-reinforced plastic, and the supporting plate is fabricated from metal, the annular supporting frame being bonded to the supporting plate.

6. The electrical energy store of claim 1, wherein the housing has a housing upper part and a housing lower part detachably connected to the annular supporting frame, the housing upper part and the housing lower part each being non-load-bearing lid-like components.

7. The electrical energy of claim 1, wherein the first module packet is attached from above to the supporting element and stands thereon, and the second module packet is attached from below to the supporting element and suspended therefrom.

8. The electrical energy store of claim 7, wherein the supporting element has a plurality of supporting plates, each supporting plate being positioned between a storage module of the first module packet and a storage module of the second module packet, and wherein each supporting plate and each storage module are connected individually to the supporting frame.

* * * * *